Feb. 10, 1959   N. J. ZABB ET AL   2,873,068
BOMB COMPUTER
Filed July 27, 1956

INVENTORS
NORMAN J. ZABB
WILLIAM H. NEWELL
HENRY F. MCKENNEY
BY
ATTORNEY

United States Patent Office 2,873,068
Patented Feb. 10, 1959

2,873,068

BOMB COMPUTER

Norman J. Zabb, Brooklyn, Henry F. McKenney, Valley Stream, and William H. Newell, Mount Vernon, N. Y., assignors to Sperry Rand Corporation, Ford Instrument Company Division, Long Island City, N. Y., a corporation of Delaware Application July 27, 1956, Serial No. 600,615

7 Claims. (Cl. 235—61.5)

This invention relates to an aircraft weapon computer which is adapted to select and introduce to a single ballistics computer the required or selected values for the given flight parameters of dive angle and altitude during the approach phase of an attack run and the actual or instantaneous values for the same parameters in the vicinity of the weapon release point in accordance with the requirements of a fire control computer.

It is deemed highly desirable that there be made available to the navigation section of the fire control computer values of dive angle and altitude which are computed for the preselected release point. On the other hand release computations should be based on actual or instantaneous flight conditions so that release or firing of the weapon may be automatically effected at the most propitious point within the vicinity of the release point to which the pilot may direct his aircraft in accordance with efficient flight commands. Accordingly, near release the release section of the computor should function on actual values and these values should thus be available to it. Since required and instantaneous flight values are desirably required for the ballistics computer at different stages of the attack run, an obvious solution would be to furnish two ballistics computers independently operating on separate inputs for the same flight parameters. This, of course, could be done only at a cost of valuable space and weight. A second solution might be to provide a switching device for consecutively feeding the two values to a single ballistics computer. However, it has been found that this expedient introduces a time delay or slewing error into the computations which would seriously affect their accuracy.

It is an object of this invention to provide means for furnishing a single ballistics computer with values at or sufficiently near the required or anticipated flight parameters that will enable it to compute navigation signals which will direct the aircraft to dive angle altitude bands within which efficient flight commands to the release point can be given and also means for furnishing the release mechanism of the computer with actual values for the flight parameters once the bands are reached. Within these bands the navigation section of the computer must continue to be furnished the required values based on the selected release point while the release mechanism is operating on the actual values. Accordingly the flight parameter selector which embodies the invention is arranged to furnish a single ballistics computer actual values for the flight parameters which are necessarily equal to the required values or so nearly equal thereto that effective flight commands may be given to make them equal. Thereby the invention achieves the same results, without sacrificing space or introducing unnecessary error factors, as would be provided by two ballistics computers operating on separate inputs or a single ballistics computer in combination with a switching arrangement.

In general the flight paramter selector comprises two identical mechanisms each mechanism having in combination a differential for computing errors or increments of dive angle and altitude based on the difference between required and actual values, limiting means for limiting these increments to relatively small values and a second differential which is employed to combine the required values and the increments and to introduce the combined values to the ballistics computer as a third value which is never permitted to depart substantially from the required value for the flight parameters and which in fact is equal to its actual value near the release point.

There follows a more detailed description of the device, the arrangement of which is illustrated schematically by drawings, in which Fig. 1 is a schematic of the computer;

Figure 1:
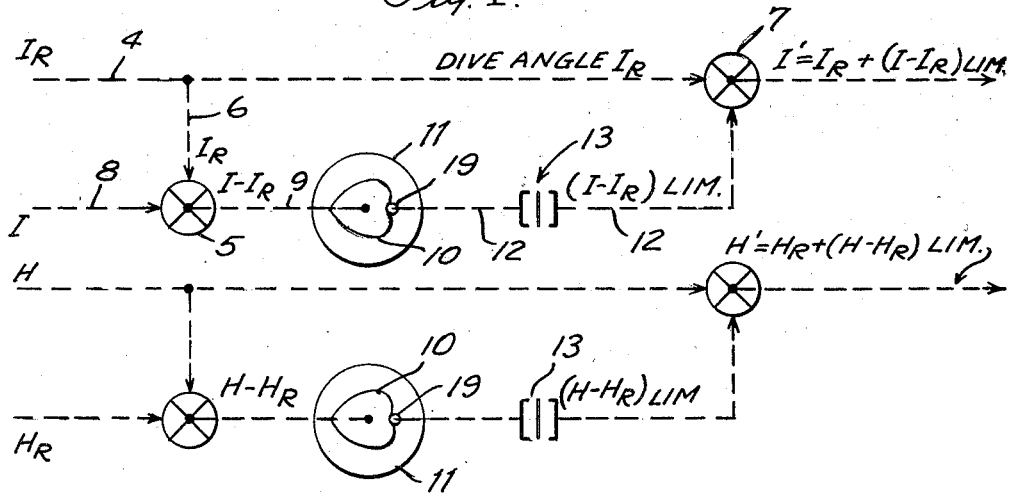

In accordance with the invention the parameter selector comprises duplicate systems the physical arrangements of which are identical but which function to generate respectively dive angle and altitude quantities for introduction to a single ballistics computor. While the dive angle system will be described, the corresponding components in the altitude system are given prime reference numerals to indicate their identity with those units in the former system.

The two systems generate novel values for dive angle having a symbol $I'$ and for altitude having a symbol $H'$ which are always equal to their required or selected values within limits. In the output of the dive angle system, $I'$ is equal to $I_R + (I - I_R)_{LIM}$ where $I_R$ is the required or computed angle at the release point and $I$ is the continuously measured value of the instantaneous or actual dive angle. Similarly the output of the altitude system is equal to $H_R + (H - H_R)_{LIM}$ where $H_R$ is the computed altitude at the release point and $H$ is the actual altitude of the aircraft with respect to the surface of the earth below. In general, means are provided to limit the computed error factors or increments $(I - I_R)_{LIM}$ and $(H - H_R)_{LIM}$, to, for example, 2° and 150 feet, respectively, so that $I'$ and $H'$ are either very nearly equal to the input for the computed values at a distance from the release point because the error factor or increments which are combined therewith are relatively small or exactly equal to the instantaneous values near the release point where the increments are within the established limits and the unlimited or true arithmetical value of the computed parameter in the increment is permitted to canel the input value for that parameter according to the aforementioned equations allowing its instantaneous value to pass the output.

Accordingly, a shaft 4 is connected to one side of differential 5 through shaft 6 and to one side of differential 7, shaft 4 being provided to introduce required values of dive angle $I_R$ to both differentials. Instantaneous values of dive angle, $I$, are continuously produced and placed into the other side of the differential 5 by means of shaft 8. An output shaft 9 connects the spider gear of the differential 5 to limiting means which include slip means such as a heart cam 10 for storing values of $I - I_R$ in excess of the preselected limits of virtue of its capacity to slip out of engagement and still maintain its reference position with respect to its driven element which comprises a coaxially mounted disc 11 as explained below and a limit stop 13 which is employed to transmit values of $I - I_R$ within the established limits when the cam and disc are in driving engagement. A shaft 12 is axially connected to the disc 11 and to the other side of the differential 7.

Figure 2:
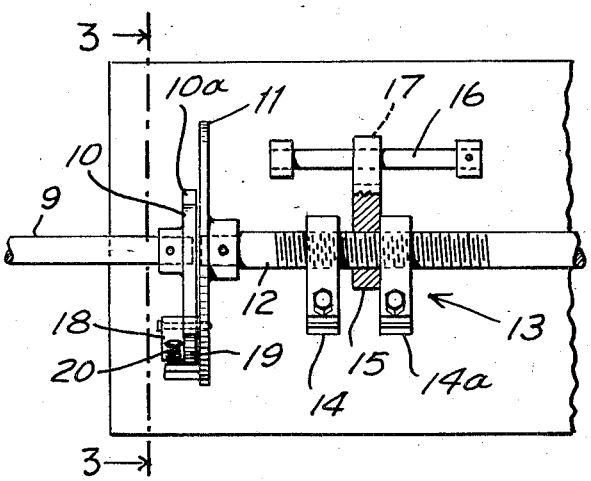
Fig. 2 is a detail of limiting device including a heart cam and limit stop.
Figure 3:
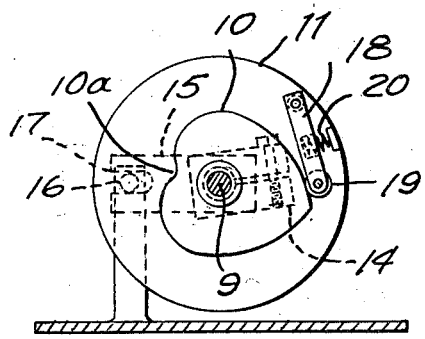
Fig. 3 is a section taken on line 3—3 of Fig. 2.

As shown in Fig. 2 the shaft 12 is intermediately threaded and there is disposed on the shaft 12 the limit stop 13 which comprises a pair of rotatable stops 14 and 14a having threaded apertures adapted to receive the threaded portion of the shaft 12. The stops are bifurcated and are provided with screw clamps to set the stops in position along the shaft 12. Also mounted on shaft 12 between the stops 14 and 14a is a block member 15 which is slidably supported on a guide 16 which extends through a bifurcated projection 17 carried by one end of member 15 to prevent the latter from turning with the rotation of the shaft 12 thus causing the member 15 to move longitudinally between the stops 14 and 14a.

A follower 18 is pivotally mounted on the disc 11 and carries a roller 19 at its free end which is urged into contact with cam 10 by spring 20 to cause the shaft 9 and the shaft 12 to rotate together when the latter shaft is not braked by the block member 15 in engagement with one of the limit stops. When the increment $I-I_R$ is relatively small the roller 19 resides in the depression 10a of the heart cam 10 and the shaft 12 is driven by shaft 9 so that the increment $I-I_R$ can be fed to the differential 7. Beyond the given maximum and minimum values as established by the limit stop 13 the shaft 12 is inoperative and the heart cam 10 turns independently thereof to store the values which are in excess of or less than the predetermined maximum and minimum values, respectively. Hence, the heart cam and disc serve as a slip coupling for the shaft 9 and the shaft 12 so as to obviate the necessity of disconnecting the two shafts when the member 15 contacts one of the stops.

It is therefore obvious that the output of the differential 7 is practically equal to the computed quantity $I_R$ due to the limitation of the increment $I-I_R$ employed to modify the output in this differential. When the shaft is operating with the member 15 positioned between the limit stops, actual values for the increment are placed into the differential 7, and $I_R$ drops out of the output and I' is equal to I, the instantaneous value. Thus the computer is capable of delivering to a single ballistics computer one or the other of its own inputs according to the stage of operation as determined by their relative values.

It is to be understood that the specific mechanism shown and described above may be modified without departing from the principle of invention, as for example, the heart cam might be replaced by a simple slip friction device when realignment is not required or may be eliminated entirely providing no undesirable loading thereby results.

What is claimed is:

1. A computer of the character described comprising a first shaft settable in accordance with a first independent variable, a second shaft settable in accordance with a second independent variable, adding means to which said first shaft is connected, subtracting means connected to said first and second shafts by which the value imparted to said first shaft is subtracted from the value imparted to said second shaft, means connecting the output of said subtracting means to said adding means, and limiting means interposed in said connecting means by which the input to said adding means is limited to some selected value, whereby said adding means is adapted to make available to its output the values set onto said second shaft or the values within limits which are placed onto the first shaft in accordance with the equation $I'=I_R+(I-I_B)_{LIM}$, where I' is the output value, $I_R$ is the independent variable on said first shaft and I is the independent variable on said second shaft.

2. A computer as claimed in claim 1 wherein said limiting means includes a limit stop.

3. A computer as claimed in claim 2 wherein said limit stop is combined with slip means to minimize the loading effect of said limit stop.

4. A computer as claimed in claim 3 wherein the slip means comprises a heart cam rotated by said subtracting means, said cam being rotatively adjacent a disc operatively connected to said limit stop and biasing means mounted on said disc engaging said heart cam to cause the latter to drive selectively said disc or rotate independently thereof when said disc is constrained by said limit stop.

5. A computer as claimed in claim 1 wherein said limiting means includes slip means.

6. A computer as defined in claim 5 wherein said slip means is a heart cam.

7. A computer of the character described comprising a first shaft settable in accordance with a first independent variable, a second shaft settable in accordance with a second independent variable, a first differential to which said first shaft is connected, a second differential to which said first and second shafts are connected, said second differential being operative to subtract the value imparted to said first shaft from the value imparted to said second shaft, means connecting the output of said second differential to said first differential, and limiting means interposed in said connecting means by which the input to said first differential is limited to some selected value, whereby said first differential is adapted to make available to its output the values set onto said second shaft or the values within limits which are placed onto the first shaft in accordance with the equation $I'=I_R+(I-I_R)_{LIM}$, where I' is the output value, $I_R$ is the independent variable on said first shaft and I is the independent variable on said second shaft.

References Cited in the file of this patent

UNITED STATES PATENTS

| | | |
|---|---|---|
| 2,414,944 | Grimshaw | Jan. 28, 1947 |
| 2,588,763 | Reilly | Mar. 11, 1952 |
| 2,722,379 | Hayek | Nov. 1, 1955 |
| 2,746,318 | Benjamin | Mar. 22, 1956 |